(No Model.)
J. G. KENYON.
VEHICLE AXLE.
No. 430,317. Patented June 17, 1890.
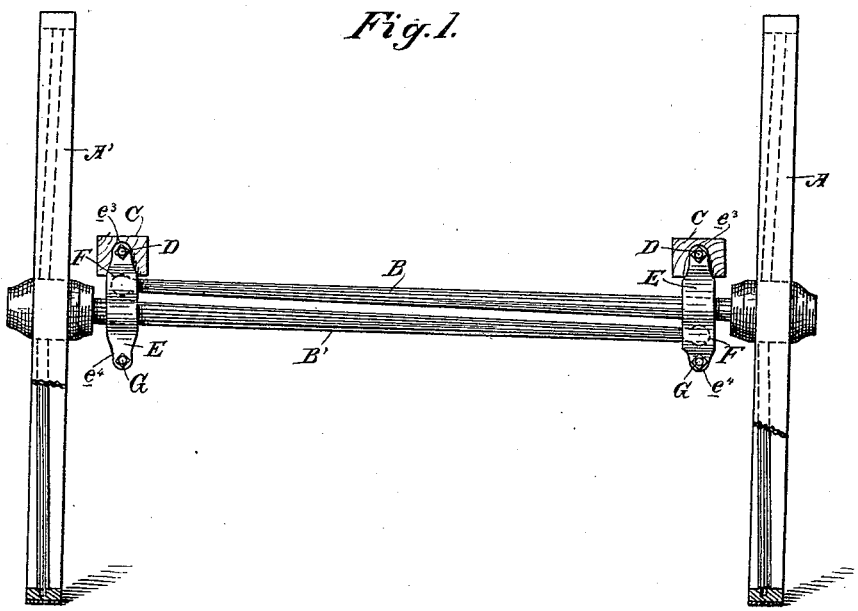
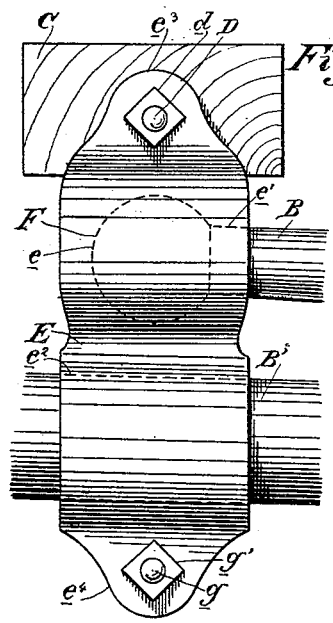
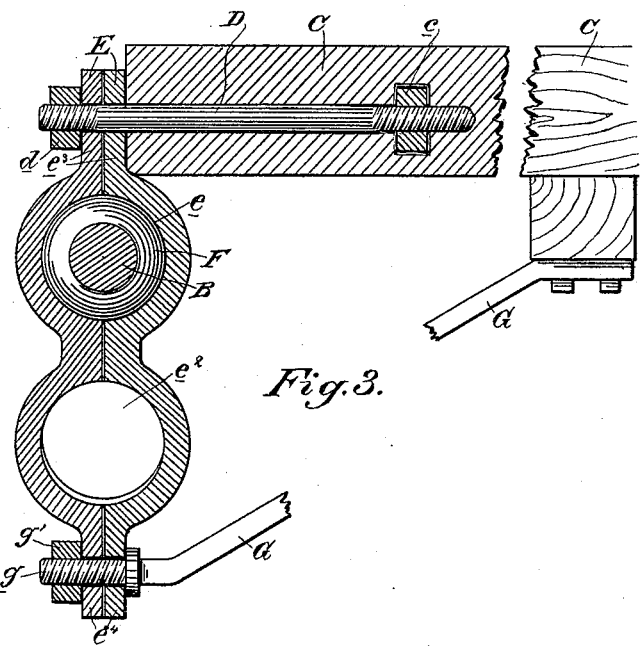
Witnesses,
J. H. Nourse
H. C. Lee.
Inventor,
Jacob G. Kenyon
By Dewey & Co.
Att'ys

UNITED STATES PATENT OFFICE.

JACOB G. KENYON, OF PORT KENYON, CALIFORNIA.

VEHICLE-AXLE.

SPECIFICATION forming part of Letters Patent No. 430,317, dated June 17, 1890.

Application filed November 5, 1889. Serial No. 329,342. (No model.)

*To all whom it may concern:*

Be it known that I, JACOB GARDNER KENYON, a citizen of the United States, residing at Port Kenyon, Humboldt county, State of California, have invented an Improvement in Vehicles; and I hereby declare the following to be a full, clear, and exact description of the same.

My invention relates to that class of vehicles represented by Letters Patent of the United States No. 392,866, which were granted to me November 13, 1888, and in which each wheel is provided with its own separate or independent axle, to which it is made fast, so that wheel and axle rotate together, said axles passing the one above the other and journaled in separate boxes on each side of the vehicle-frame.

My invention consists in the novel improvement in the wheels and axles and in the axle-bearings, hereinafter fully described, and specifically pointed out in the claims.

The object of my invention is to avoid the necessity of making the wheel on one side of greater diameter than the wheel on the other side to enable its axle or spindle to pass above the axle or spindle of the smaller wheel, and also to provide bearings for said axle or spindle of a simple and durable character.

Referring to the accompanying drawings for a more complete explanation of my invention, Figure 1 is a rear elevation of my vehicle. Fig. 2 is an elevation of the bearing on one side. Fig. 3 is a vertical section of same.

My invention, though applicable to any wheeled vehicle, I have here shown, for the sake of simplicity, as applied to a cart construction.

A is one wheel of the vehicle, and A' is the opposing wheel.

B is the axle or spindle of wheel A, and B' is the axle or spindle of wheel A'. These axles or spindles are connected rigidly to their respective wheels in any suitable manner, so that both wheel and axle rotate together.

In my former patent above referred to it was necessary, in order to allow these axles or spindles to pass by each other in different vertical planes to make the wheel on one side of greater diameter than the wheel on the other side. In my present improvement I avoid this by the following construction: As is well known, it is usual to dish the wheels of vehicles to increase their strength, and it is usual to place the wheels with their concave faces outwardly and their convex sides inwardly; but in order to get what is termed in the art "a plumb spoke" it is necessary to slightly bend the journal or end of the axle so as to throw the lower portion of the dish-shaped wheel into a perpendicular plane and thereby have a plumb spoke or perpendicular bearing for the wheel, notwithstanding its dish shape. Now, instead of so bending the journal of the axle, I allow its end to remain straight, and while I place one of the wheels—for example, the wheel A—in the ordinary manner with its concave face outwardly, I place the other wheel—say, the wheel A'—with its concave face inwardly—that is to say, I face the two wheels in the same direction instead of opposite directions, as is usually the case. Now, in order to get the plumb spoke in the wheel A, I do not bend the axle end, and I raise the axle to an inclination above the horizontal, as shown, whereby the wheel is canted so that its lower portion is thrown in a perpendicular plane. The axle B' has its end also straight, and in order to throw its wheel A' so as to obtain a plumb spoke I lower the axle B' to an inclination below the horizontal, and in this manner the two axles or spindles pass by each other, the one above and the one below, and yet both wheels may have the same diameter.

The bearings for the axles or spindles, though they may be, as far as the principal portion of my invention heretofore described is concerned, of any suitable character, I have here shown them as constructed as follows, with the view of obtaining a simple, easily-constructed, and durable device.

C are the shafts of the vehicle, which may represent any suitable portion of the frame of any vehicle. In the ends of these shafts are bored deep holes, in each of which is planted a nut c, from which extends outwardly a rod D, and projects beyond the rear end of the shaft. Upon the projecting end of this bolt are fitted the opposing bearing-plates E, each having a semi-spherical socket $e$, communicating with a groove $e'$, and each having also a semi-cylindrical socket $e^2$, so that when the two plates face each other a spherical bearing and a cylindrical bearing are formed, the former to receive the ball or spherical end F of one axle or spindle and the latter to receive the hub or wheel end of the other axle or spindle. These opposing plates are fitted on the bolt D above by means of perforated top ears $e^3$, and said plates are formed below with perforated bottom ears $e^4$, through which the threaded or bolt end $g$ of a brace-rod G extends and receives a nut $g'$. A nut $d$ is also fitted on the end of the bolt D above. There is one of these two-part bearings on each side of the vehicle, and each receives the outer or free end of one axle and the hub or wheel end of the opposite axle, so that said axles are journaled at opposite sides in separate bearings.

Having thus described my invention, what I claim as new, and desire to secure by Letters Patent, is—

1. In a vehicle, opposing wheels and a separate axle for each wheel, and so connected therewith that wheel and axle shall rotate together, said axles passing the one above the other, the upper one being inclined above and the lower one inclined below an intervening horizontal plane and journaled in separate boxes at each side, substantially as herein described.

2. In a vehicle, the dish-shaped wheel A, having its concave face turned outwardly and the axle of said wheel so secured to it that wheel and axle shall rotate together, said axle extending across the vehicle at an inclination above the horizontal, in combination with the opposing dish-shaped wheel A', having its concave face turned inwardly, and the axle of said wheel so secured thereto that wheel and axle shall rotate together, said axle extending across the vehicle at an inclination below the horizontal, whereby said axles pass each other, substantially as herein described.

3. In a vehicle, the combination of the opposing wheels dished or concaved in the same direction and the separate axles, one for each wheel and connected therewith so that wheel and axle shall rotate together, said axles passing the one above the other and inclined above and below an intervening horizontal plane, whereby the wheels are thrown on a plumb spoke, and separate boxes for each axle or spindle at each side, substantially as herein described.

4. In a vehicle, opposing wheels, each having an independent axle so connected with it that wheel and axle shall rotate together, said axles passing each other and each having a spherical outer end, in combination with the vehicle-frame, the opposing independent plates depending from the frame on each side, said plates being bolted together and having formed between them a spherical socket for the spherical outer end of the axles, and a cylindrical socket for the wheel or hub end of said axles, substantially as herein described.

In witness whereof I have hereunto set my hand.

JACOB G. KENYON.

Witnesses:
  S. H. NOURSE,
  H. C. LEE.